(12) United States Patent
Xu et al.

(10) Patent No.: US 10,880,705 B2
(45) Date of Patent: Dec. 29, 2020

(54) MULTI-CONNECTIVITY CHARGING IN HETEROGENEOUS NETWORKS

(71) Applicant: Nokia Technologies Oy, Espoo (FI)

(72) Inventors: Xiang Xu, Nanjing (CN); Srinivasan Selvaganapathy, Bangalore (IN); Tsunehiko Chiba, Saitama (JP)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/091,499

(22) PCT Filed: Mar. 22, 2017

(86) PCT No.: PCT/FI2017/050200
§ 371 (c)(1),
(2) Date: Oct. 4, 2018

(87) PCT Pub. No.: WO2017/174866
PCT Pub. Date: Oct. 12, 2017

(65) Prior Publication Data
US 2019/0132713 A1    May 2, 2019

(30) Foreign Application Priority Data

Apr. 6, 2016   (IN) .............................. 201611012092

(51) Int. Cl.
*H04W 4/24*   (2018.01)
*H04L 5/00*   (2006.01)
(Continued)

(52) U.S. Cl.
CPC ............... *H04W 4/24* (2013.01); *G06F 7/10* (2013.01); *G06Q 20/145* (2013.01);
(Continued)

(58) Field of Classification Search
None
See application file for complete search history.

(56) References Cited

U.S. PATENT DOCUMENTS 8,265,255 B1 * 9/2012 Abrishami .......... H04M 7/1205
379/220.01
2010/0067400 A1   3/2010 Dolganow et al.
(Continued)

FOREIGN PATENT DOCUMENTS

| JP | 2015167313 A | 9/2015 |
|---|---|---|
| WO | WO-2013144094 A1 | 10/2013 |
| WO | WO-2015115034 A1 | 8/2015 |

OTHER PUBLICATIONS

3GPP, "LTE-WLAN Radio Level Integration and Interworking Enhancement," 3GPP TSG RAN Meeting #70, RP-160521, Sitges, Spain, Dec. 7-10, 2015.
(Continued)

*Primary Examiner* — Suhail Khan
(74) *Attorney, Agent, or Firm* — Mintz Levin Cohn Ferris Glovsky and Popeo, P.C.

(57) ABSTRACT

Methods and apparatus, including computer program products, are provided for charging in multi-connectivity systems. In some example embodiments, there may be provided a method that includes marking, by a first base station serving a user equipment, at least one packet to include a first indication indicating that the at least one packet was received directly at the first base station serving the user equipment; and marking, by the first base station, at least one other packet to include a second indication to indicate that the at least one other packet was received via a second base station also serving the user equipment. Related systems, methods, and articles of manufacture are also described.

15 Claims, 4 Drawing Sheets

(51) Int. Cl.
  *G06F 7/10*    (2006.01)
  *H04L 12/14*   (2006.01)
  *H04M 15/00*   (2006.01)
  *G06Q 20/40*   (2012.01)
  *G06Q 20/14*   (2012.01)
  *G06Q 20/32*   (2012.01)
  *H04W 84/04*   (2009.01)

(52) U.S. Cl.
  CPC ......... *G06Q 20/325* (2013.01); *G06Q 20/405* (2013.01); *H04L 5/001* (2013.01); *H04L 5/0091* (2013.01); *H04L 12/1403* (2013.01); *H04L 12/1425* (2013.01); *H04M 15/49* (2013.01); *H04M 15/60* (2013.01); *H04M 15/70* (2013.01); *H04M 15/73* (2013.01); *H04M 15/8214* (2013.01); *H04W 84/045* (2013.01)

(56) References Cited

U.S. PATENT DOCUMENTS

2017/0034756 A1   2/2017   Faccin et al.
2017/0208501 A1   7/2017   Lee et al.

OTHER PUBLICATIONS

3GPP, "Policing, Authorization, and Charging for LTE/WLAN Aggregation," 3GPP TSG-RAN WG2 Meeting #91, R2-153813, China, Aug. 24-28, 2015, (2 pages).

3GPP, "Presentation of Specification/ Report to TSG: TS36.360, Version 1.0.0," 3GPP TSG-RAN Meeting #71, RP16096, Sweden, Mar. 7-10, 2016, (10 pages).

3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3rd Partnership Generation Project, 3GPP TS 36.300 V13.2.0, Dec. 2015, (358 pages).

3GPP, "Technical Specification Group Radio Access Network; Scenarios and requirements for small cell enhancements for E-UTRA and E-UTRAN (Release 15)," 3rd Partnership Project, 3GPP TR 36.932 V15.0.0, Jun. 2018, (14 pages).

3GPP, "Technical Specification Group Radio Access Network; Study on Small Cell enhancements for E-UTRA and E-UTRAN; Higher layer aspects (Release 12)," 3rd Generation Partnership Project, 3GPP TR 36.842 V.12.0.0, Dec. 2013, (32 pages).

* cited by examiner

MULTI-CONNECTIVITY CHARGING IN HETEROGENEOUS NETWORKS

CROSS REFERENCE TO RELATED APPLICATIONS

This application is a national-phase entry of Patent Cooperation Treaty Application No. PCT/FI2017/050200 filed Mar. 22, 2017, entitled "MULTI-CONNECTIVITY CHARGING IN HETEROGENEOUS NETWORKS," which claims priority from Indian Patent Application No. 201611012092 filed on Apr. 6, 2016, entitled "MULTI-CONNECTIVITY CHARGING IN HETEROGENEOUS NETWORKS," the contents of which are hereby incorporated by reference in their entirety.

FIELD

The subject matter described herein relates to tracking usage to enable charging in wireless networks.

BACKGROUND

Dual Connectivity refers to the operation a user equipment, such as a smart phone, a tablet, and/or the like, configured to use the radio resources provided by two distinct resource schedulers that are located in two base stations such as evolved Node B base stations, which are connected via a link such as a backhaul over an interface such as the X2 interface (see, for example, 3GPP TR 36.842 [59] and TR 36.932 [60]).

The evolved Node B base station that is in dual connectivity with a given user equipment may act as a master evolved Node B (MeNB) base station or as a secondary evolved Node B(SeNB) base station. While in dual connectivity, the UE may be connected to a single MeNB and a single SeNB. In the case of E-UTRAN, there may be provided dual connectivity that supports Long Term Evolution (LTE)-Wireless Local Area network (WLAN) aggregation (LWA). When in dual connectivity, the base stations, such as the MeNB and SeNB, may use the same radio access technologies (for example, the MeNB and SeNB may both implement an LTE radio access technology and/or the like) to the user equipment or may use different radio access technologies to the user equipment (for example, the MeNB may operate using a 5G radio access technology, while the SeNB may operate in using another, different radio access technology such as LTE).

SUMMARY

Methods and apparatus, including computer program products, are provided charging in multi-connectivity systems.

In some example embodiments, there may be provided a method that includes marking, by a first base station serving a user equipment, at least one packet to include a first indication indicating that the at least one packet was received directly at the first base station serving the user equipment; and marking, by the first base station, at least one other packet to include a second indication to indicate that the at least one other packet was received via a second base station also serving the user equipment.

In some variations, one or more of the features disclosed herein including the following features can optionally be included in any feasible combination. The first indication and the second indication may enable a network node to determine charging for the at least one packet and/or the at least one other packet. The first base station may include a master cell serving the user equipment. The second base station may include at least one secondary cell serving the user equipment. The first base station and the second base station may be in dual connectivity with the user equipment. The first base station may receive at least one downlink packet including an indication regarding whether the at least one downlink packet should be transmitted by the first base station directly to the user equipment or should be forwarded to the second base station for transmission to the user equipment. The first base station may send, based on the indication, a packet to the user equipment by transmitting the packet directly or by forwarding the packet to the second base station. A gateway node may place the indication on the at least one downlink packet. The first base station may report to a network node a resource allocation at the first base station and the second base station. The first base station may report to a network node a deviation from a resource allocation, the first indication, and/or the second indication. The first indication, the second indication, and a deviation may enable a network node to determine charging for the at least one packet and/or the at least one other packet. The network node may include a mobility management entity, a serving gateway, and/or a packet gateway.

In some example embodiments, there may be provided a method that includes receiving, at a network node, at least one packet including a first indication and at least one other packet including a second indication, wherein the first indication indicates that the at least one packet was received directly at a first base station serving a user equipment, and wherein the second indication indicates that the at least one other packet was received via a second base station also serving the user equipment; and providing, based on the first indication and the second indication, charging information to a charging system, wherein the charging information takes into account whether a packet to the user equipment was served by the first station or served by the second base station.

In some variations, one or more of the features disclosed herein including the following features can optionally be included in any feasible combination. The network node may receive a resource allocation between the first base station and the second base station. The network node may mark, based on the received allocation, a downlink packet with the first indication and/or the second indication to enable the first base station to determine whether to serve the packet directly to the user equipment or forward the packet to the second base station to enable the second base station to serve the packet to the base station. The network node may receive a deviation from a resource allocation, the first indication, and/or the second indication and may provide, based on the deviation, charging information to a charging system, wherein the charging information takes into account whether a packet to the user equipment was served by the first station or served by the second base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

In some example embodiments, dual connectivity charging is provided to enable support for heterogeneous networks including at least one small cell. In some example embodiments, a split bearer may be configured to enable uplink and/or downlink data to be carried to a user equipment (UE) via two or more base stations. In some example embodiments, the data, such as packets, carried to, and/or from, the UE may be marked to indicate whether the packet traversed a first base station, such as a master or macro base station, or was offloaded to a second base station, such as a secondary or small cell access point. In some example embodiments, this packet marking enables the network to determine charging. For example, packets served to the UE via the secondary or small cell access point or base station may not be charged or charged at a lower rate, when compared to packets served to the UE directly from the master base station. In this way, the network may take into account, for purposes of charging, whether data was sent directly by a first base station, such as a master base station, or was offloaded to a secondary base station.

Although some of the examples described herein refer to dual connectivity to the user equipment, multi-connectivity may be provided as well. For example, a single master base station may serve a user equipment, while a plurality of secondary base stations also serve the user equipment.

Figure 1:
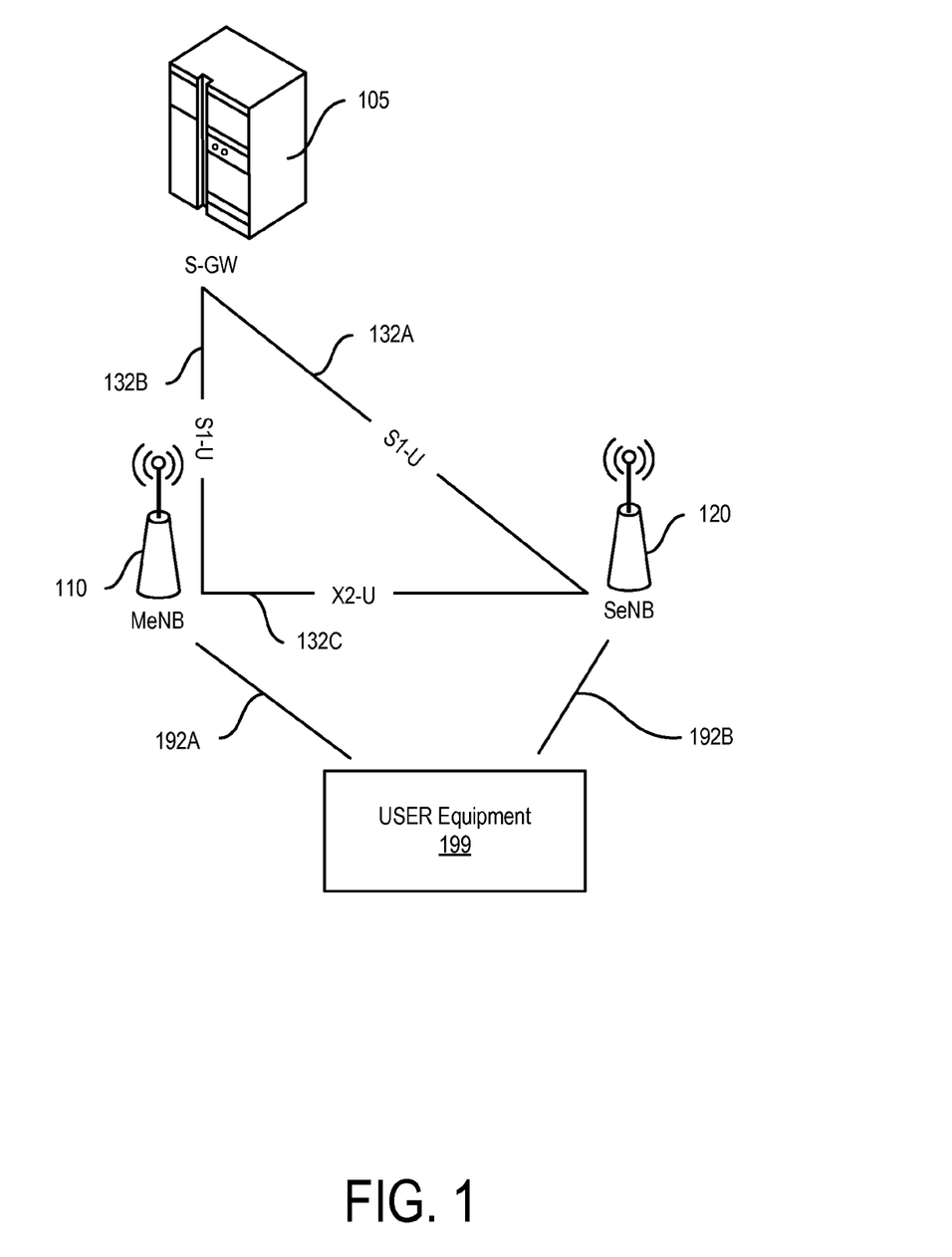
FIG. 1 depicts an example of a system including user plane connectivity that supports dual connectivity, in accordance with some example embodiments.

FIG. 1 depicts an example system 100 showing user plane connectivity supporting dual connectivity, in accordance with some example embodiments. As shown at FIG. 1, a user equipment 199 may be configured for dual connectivity. When this is the case, the UE 199 may be served via downlink (and/or an uplink) 192A by a primary or master node, such as a master evolved Node B base station (MeNB) 110. The UE 199 in dual connectivity may also be served by secondary nodes, such as secondary evolved Node B base station (SeNB) 120.

The system 100 may further include other network nodes such as a serving gateway (SGW) 105. The SGW 105 may be configured to a provide control plane interface to a mobility management interface and provide control and data plane interfaces to a packet gateway (PGW). The SGW 105 may also support a user plane interface, such as S1-U 132A-B with base stations, such as eNodeB type base stations.

In the case of dual connectivity, there may different bearer options, which can be configured within different user plane architectures depending on the bearer option configuration (see, e.g., 3GPP TR 36.300). For master cell group (MCG) bearers for example, the S1-U interface 132B connection for the corresponding bearer(s) to the S-GW 105 may be terminated in MeNB 110. The secondary evolved Node B base station 120 may not be involved in the transport of user plane data for this type of bearer(s) over the Uu interface (which is an interface between the UE and the base station). For split bearers for example, the S1-U interface 132B connection to the S-GW 105 may be terminated in the MeNB 110. Packet data convergence protocol (PDCP) data may be transferred between the MeNB 110 and the SeNB base station 120 via an X2-U 132C interface. The secondary evolved Node B base station 120 and MeNB 110 may be involved in transmitting data of this bearer type over the Uu interface. In the case of secondary cell group (SCG) bearers for example, the secondary evolved Node B base station 120 may be directly connected to the S-GW 105 via the S1-U interface 132A, while the MeNB 110 may not be not involved in the transport of user plane data for this type of bearer(s) over the Uu interface. In dual connectivity, the SCG may represent a group of serving cells associated with the SeNB. These serving cells may include a primary secondary cell (PSCell) and/or or more SCells (see, for example, 3GPP TS 36.300).

Figure 2:
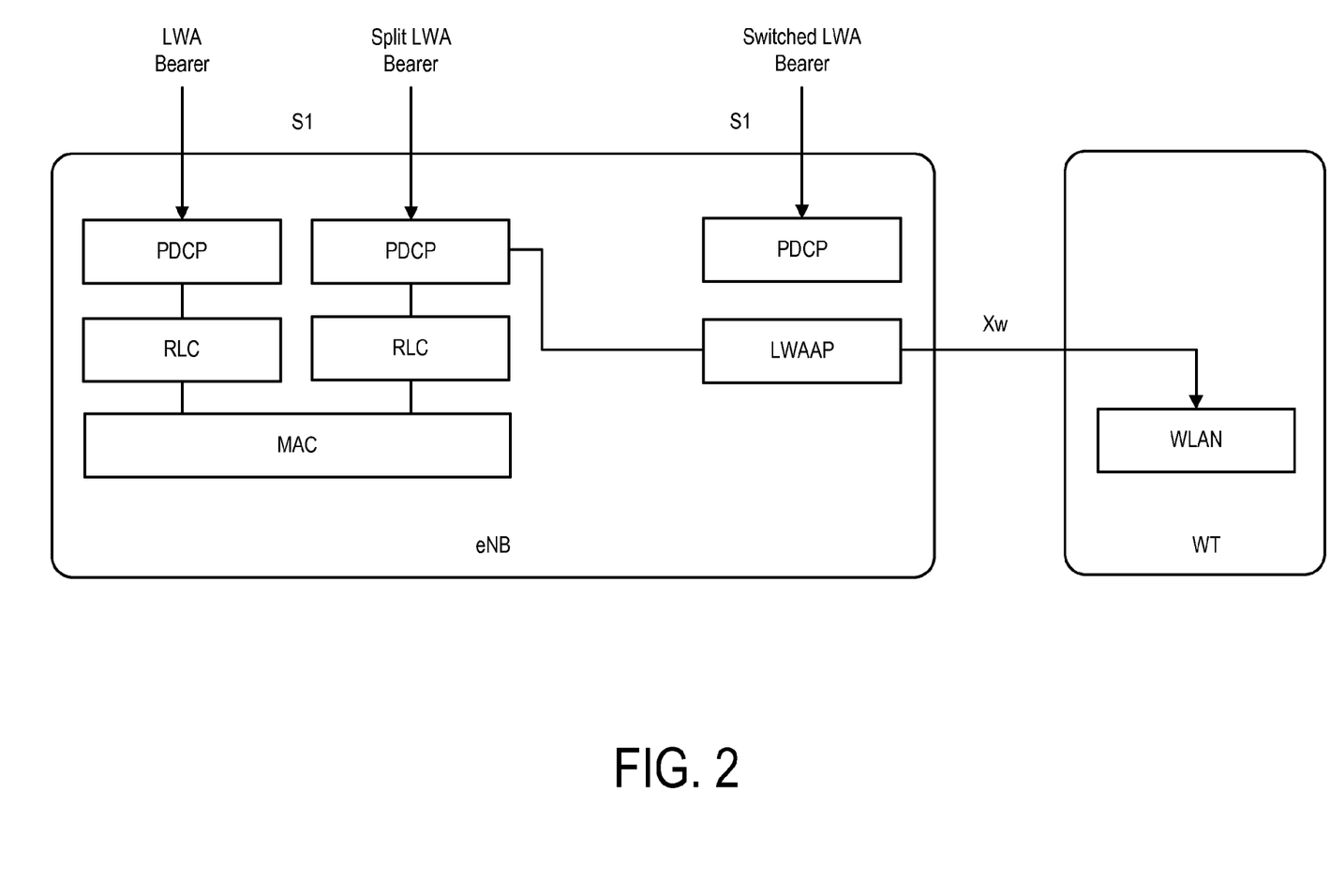
FIG. 2 depicts an example of a protocol stack supporting split bearers, in accordance with some example embodiments.

FIG. 2 depicts a protocol stack 200 for internetworking in cellular (for example, LTE and/or the like) to wireless local area network (WLAN), in accordance with some example embodiments. In the example of FIG. 2, dual connectivity may be further extended so that a primary or a macro-node, such as MeNB 110, may use the split bearer option for dual connectivity to UE 199. The spit bearer at MeNB 110 may enable offloading of traffic towards a secondary node such as SeNB 120 providing for example WLAN access, unlicensed access (for example, an LTE-U node providing unlicensed spectrum access), and/or the like. For example, in License Assisted Access (LAA, where an unlicensed carrier may be used as a secondary component carrier in the carrier aggregation), the UE 199 may be served by a MeNB 110 providing for example a master LTE cell and at least one secondary node such as SeNB 120 providing at least one secondary cell (Scell) operating in the unlicensed portion of the spectrum. In LTE-WLAN Aggregation (LWA) for example, a UE 199 may utilize radio resources of a cellular network such as LTE and of a WLAN, such as WiFi and/or the like. The radio bearer may be a LWA bearer, a split LWA bearer, and/or a switched LWA bearer as shown at FIG. 2. In the case of a 5G node, there may also be provided options for dual connectivity as well between LTE nodes and 5G nodes.

Although some of the examples described herein refer to a split bearer, the bearer may support more than the two dual connectivity connections as noted above.

In some current LTE-based dual-connectivity approaches, the SGW 105 (or for example a packet gateway, PGW) may not know which user data is being sent to (or received from) UE 199 via a master or primary network node such as the MeNB 110 or via a secondary network node such as the SeNB 120. Because of this lack of awareness on the part of the network and, in particular the SGW/PGW 105, there may be incorrect charging to the UE 199 or its associated user.

In the case of offline charging for example, the network may incorrectly charge the UE. To illustrate further, suppose a split bearer is used for a specific UE 199 and a given total data volume of for example 100 Gigabytes (G) is sent to the UE 199. In this example, suppose that some of the data (e.g., 20G of data) was served to the UE 199 by the MeNB 110, while the SeNB 120 serves the remaining portion (e.g., 80G of data) to the UE 199. Because the SGW/PGW 105 does not have knowledge with respect to the split bearer, the SGW/PGW 105 may incorrectly charge all 100 G of the served data to UE 199, when only the small 20G data portion should have been charged and the reset 80G data port portion may utilize a low (or no) charging rate. With online charging, the SGW/PGW 105 may also incorrectly consider all 100G being served by the MeNB 110, and incorrectly deduct from an offline account 100G worth of credit for UE 199, when most of the traffic is actually served by the SeNB 120 with a low (or no) charging rate. Although the previous examples refer to a specific use case, the split bearer dual connectivity-charging problem may also have similar charging errors in LTE-LTE-U or LTE-5G dual connectivity implementations.

In some example embodiments, there is provided a way to support online/offline charging in systems using dual connectivity or split bearers including small cells. For example, the UE 199 may be served by a primary or master node such as MeNB 110 (which may provide a Pcell) and at least one secondary node such as SeNB 120 (which may provide at least one Scell). The data traffic to, and/or from, the UE 199 may be split between the MeNB 110 and the SeNB 120. This split bearer configuration (and which traffic traverses the MeNB 110 versus the SeNB 120) may be dependent on a variety of factors including resource conditions at the primary or secondary nodes and/or QoS information received from for example the packet core, the UE, or other nodes.

In some example embodiments, the charging for the UE 199 (or its associated user) may be based on data traffic measurements at PGW/SGW 105. For example, the PGW/SGW 105 may measure markings on packets indicating whether the packets traversed the MeNB 110 and/or the SeNB 120.

In some example embodiments, the MeNB 110 may inform via the control plane or user plane other nodes (for example, the SGW 105, the core network, and/or the like) about the split bearer resource allocation to the secondary node, SeNB 120, for a specific UE such as UE 199. When the control plane is used, the S1 application protocol procedure (or for example, a path update) may be extended or configured to carry an indication of the split bearer resource allocation to SeNB 120 for a specific UE 199. When the user plane is used, the GPRS Tunneling Protocol User Plane (GTP-U) may be extended or configured to carry an indication of resource allocation in SeNB 120 for a specific UE 199. The split bearer resource allocation information can be indicated as guaranteed bit rate (GBR)/maximum bit rate (MBR).

In some example embodiments, a network node (for example, the SGW/PGW 105, a core network node, and/or the like) may, based on the received split bearer resource allocation information obtained from for example MeNB 110, mark certain downlink packets, such as one or more GTP-U packets. Upon the receipt of the marked packet such as the GTP-U packet, a first base station such as MeNB 110 knows whether the downlink data can be sent via the first base station or offloaded to a second base station such as SeNB 120. In some example embodiments, the marking, such as an indication, on the packet may represent an extension or enhancement to the packet such as the GTP-U. For example, the marking may include a cell identifier, a base station identifier (eNB ID), and/or the like.

In some example embodiments, a network node (for example, the SGW/PGW 105, a core network node, and/or the like) may implicitly mark certain downlink packets, such as one or more GTP-U packets, flowing towards MeNB/SeNB and the UE. For example, the SGW/PGW 105 may mark the downlink GTP-U packets with an identifier of the secondary SeNB 120. The identifier may comprise an identifier of the small cell, such as a cell ID, a base station ID of SeNB 120, a small cell group ID of the SeNB 120, and/or the like. As the SGW/PGW 105 in this example marks the packets being forwarded to the SeNB 120, the SGW/PGW 105 may not explicitly mark the packets that will be sent directly from the MeNB 110 to the UE 199 (since the lack of a mark implies that the packet is not being forwarded to the SeNB 120 so it can server the packet to the UE 199).

Alternatively or additionally to the above-noted marking, the network node may provide a ratio of downlink packet transfer to be maintained between the MeNB 110 and SeNB 120. This ratio may be provided in a variety of ways to the MeNB 110 but in some example embodiments, a signaling message may be sent from the network node to the MeNB. Moreover, the network node may provide a margin for the ratio. The margin may indicate a variation allowed in the ratio between the MeNB and SeNB. If the margin is exceeded, this deviation may trigger a reportable condition causing a message or other indication to be sent to the network node. For example, if the ratio is 50% with a 10% percent margin, the packets to UE 199 may be split evenly between the MeNB 110 and SeNB 120. If for some reason, the ratio drops below 40% or goes above 60%, the MeNB 110 may report to the network that the ratio's threshold condition has been triggered.

In some example embodiments, the first base station such as MeNB 110 may mark an uplink packet, such as a GTP-U packet, based on whether the uplink data is received from MeNB 110 or via another secondary node, such as SeNB 120. In some example embodiments, the marking on the packet may represent an extension or enhancement to the packet such as the GTP-U. For example, the marking may include a cell identifier, a base station identifier (eNB ID), and/or the like. Based on the GTP-U marking, the network node may generate accounting information to reflect the actual usage in each of the first base station/MeNB 110 or the second base station/SeNB 120. For offline charging, the core network may generate an indication of an adjustment or credit accordingly deducting from an offline account.

In some example embodiments, the first base station such as MeNB 110 may inform a network node (for example, a core network node, a SGW/PGW 105 and/or the like) when the first base station/MeNB 110 detects a deviation from for example the marking, a deviation from the ratio, a deviation from a threshold(s) amount with respect to the ratio, if the first base station/MeNB 110 cannot maintain the proposed ratio between first base station/MeNB 110 and the second base station/SeNB 120, and/or a period of time expires. The mismatch (deviation) can happen for example when the downlink data is delivered via a base station that is different to one as marked by for example a core network node, such as SGW/PGW 105. Moreover, the first base station, such as MeNB 110, may inform or report to the network the deviation(s) via the control plane or the user-plane, and this reporting may include a proposed change regarding the marking ratio between the MeNB 110 and SeNB 120. The network node, such as the PGW/SGW 105, may accept the proposal or respond with a modified marking ratio.

In some example embodiments, there may be a change to the secondary node such as SeNB 120, to another secondary node but the anchor node such as MeNB 110 in this example may remain the same. When this is the case, the marking on the uplink packets such as GTP may include information related to the new SeNB base station and/or an additional indication that the switch to the new SeNB has already taken place. When no uplink packets are scheduled during the secondary node change, a packet such as a GTP packet without payload and a new identifier can be sent. The SGW 105 may use this information for further decision making with respect to downlink marking or setting of thresholds dependent on charging policy for the new SeNB node. Moreover, when the MeNB releases the SeNB resources (for example, when the UE moves out from the SeNB's coverage area), the marking on the uplink packets to the network node (e.g., SGW/PGW 105) may also should indicate the there is no longer a secondary node, SeNB. When the network node such as the SGW/PGW reads the packets, the SGW/PGW may mark all downlink packets so that they instead go to the MeNB rather than the non-existent SeNB, until another SeNB is added. Moreover, the SGW/PGW may provide charging information that is only against the MeNB, rather than the non-existent SeNB.

Figure 3:
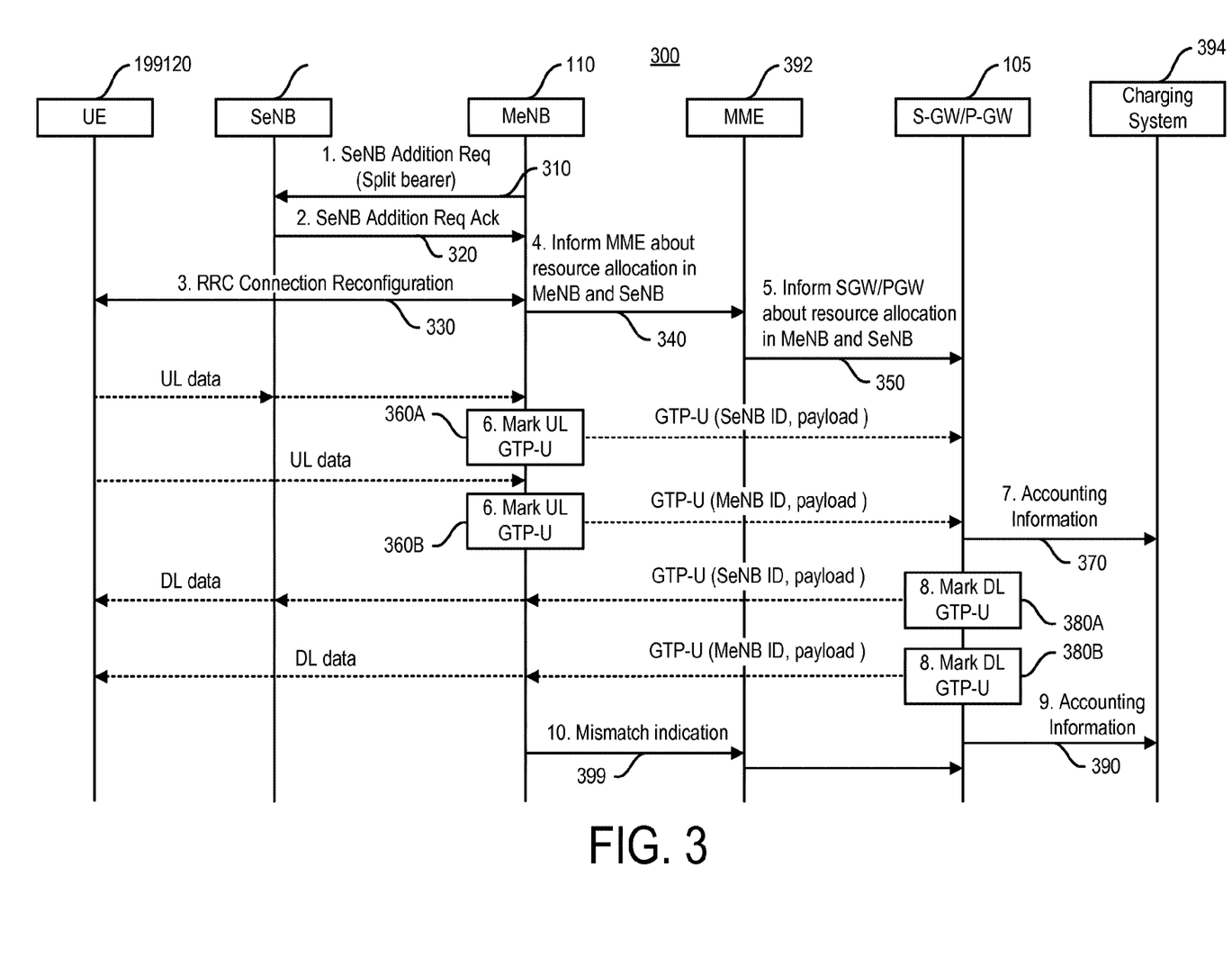
FIG. 3 depicts an example of a signaling diagram supporting dual connectivity charging, in accordance with some example embodiments.

FIG. 3 depicts a signaling diagram 300, in accordance with some example embodiments.

The signal diagram 300 depicts a user equipment 199 and a secondary node, such as a secondary evolved Node B base station (SeNB) 120 serving a secondary cell (Scell). The diagram 300 also depicts a mobility management entity 392, a SGW/PGW 105, and a charging system server 394.

The secondary evolved Node B base station 110 may comprise a WLAN access point, a 5G node, a LTE-U access point, and/or any other type of radio access point configured to provide a secondary (and/or a small cell) node for dual connectivity. The secondary evolved Node B base station may be configured to serve one or more radio access technologies including WLAN, 5G, LTE, and/or the like. The diagram 300 also includes a master evolved Node B base station (MeNB) 110 serving a primary cell. As noted, the MeNB 110 and the SeNB 120 may implement the same or different radio access technologies.

In some example embodiments, the master evolved Node B base station 110 may, at 310, send a request to secondary evolved Node B base station 120 to add a dual connectivity bearer, such as a split bearer. At 320, the secondary evolved Node B base station 120 may, in accordance with some example embodiments, accept the request to add a split bearer. This acceptance may be implemented as an acknowledgement message.

At 330, the master evolved Node B base station 110 may send a connection reconfiguration request to UE 199. The connection reconfiguration may be provided via radio resource control (RRC) signaling that includes a resource allocation for the dual connectivity that enables offloading to the secondary evolved Node B base station 120.

At 340, the master evolved Node B base station 110 may inform the mobility management entity 392 about the dual connectivity/split bearer resource allocation in the master evolved Node B base station 110 and/or the secondary evolved Node B base station 120. For example, the master evolved Node B base station 110 may inform the mobility management entity 392 via for example an S1 path update procedure or other S1 procedures. The resource allocation regarding the dual connectivity/split bearer may indicate for each of the MeNB and SeNB QoS information, such as the uplink and/or downlink guaranteed bit rate (GBR), a maximum bit rate (MBR), and/or the like. To illustrate further, the resource allocation may indicate that 40 Mbps should be allocated to master evolved Node B base station 110, while 60 Mbps should be allocated to secondary evolved Node B base station 120. And, this allocation may be signaled at 340.

In some example embodiments, the MME 392 may send to master evolved Node B base station 110 an acknowledge message (which may be in response to 340). The acknowledgement message may indicate or include a trigger condition, which may specify when the master evolved Node B base station 110 is to send a report or update information. For example, MME 392 may provide the trigger condition to the master evolved Node B base station 110, and this trigger condition may request the base station 110 to send or report mismatch or deviation information when the quantity of downlink packets are not sent according the ratio or corresponding downlink markings (e.g., when 10 Kilobytes of downlink packets marked for the master evolved Node B base station 110 are instead sent via secondary evolved Node B base station 120, this may trigger reporting of the deviation).

At 350, the MME 392 may inform the SGW/PGW 105 about the split bearer resource allocation information in master evolved Node B base station 110 and/or the secondary evolved Node B base station 120. In addition to the use case when a secondary evolved Node B base station is added, 340 and/or 350 may also be used whenever there is a change to the resource allocation in the master evolved Node B base station and/or the secondary evolved Node B base station. Alternatively or additionally, the master evolved Node B base station may send a special uplink packet such as a GTP-U packet including the information about the split bearer resource allocation in master evolved Node B base station and secondary evolved Node B base station (which may reduce the need to make changes to S1 interface and the MME).

At 360A, the master evolved Node B base station 110 may receive, via an uplink, uplink data from the secondary evolved Node B base station 120 (which is serving the UE 199), and the master evolved Node B base station 110 may mark the uplink packets (for example, GTP-U packets) to indicate that the uplink data is received from the secondary evolved Node B base station 120. Although FIG. 3 depicts the marking as an SeNB ID, the indication may take other forms, such as a cell identifier and/or the like. At 360B, the master evolved Node B base station 110 may receive, via an uplink, data directly from the UE 199, and, as such, the master evolved Node B base station 110 may mark the uplink packets (for example, GTP-U packets) to indicate that the uplink data is received directly from the UE 199 (and not via the offload path provided by the secondary evolved Node B base station 120). As noted, the packets such as GTP-U packets may be enhanced to include additional informational to indicate whether the uplink data is received from the secondary evolved Node B base station 120 (as in 360A) or received directly at the master evolved Node B base station (as in 360B). This marking (or additional information) may include a cell ID or a base station ID (eNB ID) of the master evolved Node B base station or the secondary evolved Node B base station 120. As used herein, the marking may comprise generating a packet to include the marking, changing a portion such as a field of a packet, and/or the like. Moreover, the marking may be implicit or explicit as noted above. Moreover, the marked packet may comprise any type of packet. However, in some example embodiments, payload for the UE may be encapsulated for traffic within the network in an encapsulating, tunneling packet, such as a GTU-P packet. When this is the case, the marking may comprise adding an indication to the GTU-P to indicate whether the payload was served by the MeNB or the SeNB.

At 370, the SGW/PGW 105 may receive the marked packets sent at 360A-B and then send accounting information to the charging system 394, in accordance with some example embodiments. Referring again to the 100 Gigabyte data example above, the SGW/PGW 105 may read the markings eNB ID or cell ID on the packets, such as GTU-P packets, and determine that some of the data (e.g., 20G of data) was served to the UE 199 by the MeNB 110, while the SeNB 120 served the remaining portion (e.g., 80G of data) to the UE 199. For offline charging, the accounting information may include charging information to allow charging for the 20 G of data served at a first rate, and charging the 80 G at a second or reduced rate (such as for example, no charge). For online charging, the SGW/PGW 105 may update the credit.

At 380A-B, downlink data packets such as the GTP-U packet to the UE 199 may be marked by a network node, such as SGW/PGW, and this marking may indicate whether the marked packet should be sent via master evolved Node B base station 110 or secondary evolved Node B base station 120, in accordance with some example embodiments. The SGW/PGW 105 may make the marking decision or the downlink data packets based on the resource allocation information received in 350. When the master evolved Node B base station 110 receives the GTP-U packet, base station 110 may send it in accordance with the marking to the UE 199 directly via master evolved Node B base station's 110 cell or forward the packets to UE 100 via the secondary evolved Node B base station 120, so base station 120 can send it to the UE 199. For a non-guaranteed bit rate bearer (which may not require a strict quality of service per se), the SGW/PGW 105 may mark the downlink GTP-U data packets based on the SGW/PGW's own preferences, configuration, and/or the like (for example, if overloaded, the SGW/PGW may mark packets as low priority).

As noted above, in some example embodiments, the marking may be implicit. For example, the SGW/PGW 105 may mark downlink GTP-U packets that will be forwarded by the MeNB 110 to the secondary evolved Node B base station 120, which serves the packets to the UE 199. However, the SGW/PGW 105 may not explicitly mark downlink GTP-U packets that be served by the MeNB 110 directly to the UE 199 (as the lack of an actual indication implies that the MeNB 110 should serve the packet rather than forward the packet to the SeNB 120).

At 390, for offline charging, SGW/PGW 105 may send accounting information to the charging system 394, in accordance with some example embodiments. For online charging, the PGW may update with a credit.

At 399, when there is a mismatch or deviation condition triggered (for example, the mismatched packets exceed a threshold received in 340, the expiry of a time period received at 340, and/or the like), the master evolved Node B base station 110 may report the mismatch or deviation to MME 392, which may forward the reported mismatch to SGW/PGW 105. The mismatch indication may indicate which of the downlink GTP-U packets are sent via a base station that is different or deviates from the marking specified by the SGW/PGW, or indicate a quantity of packets sent via master evolved Node B base station and the secondary evolved Node B base station, and/or the like. The mismatch reporting may be implemented via control plane signaling or user plane signaling.

Figure 4:
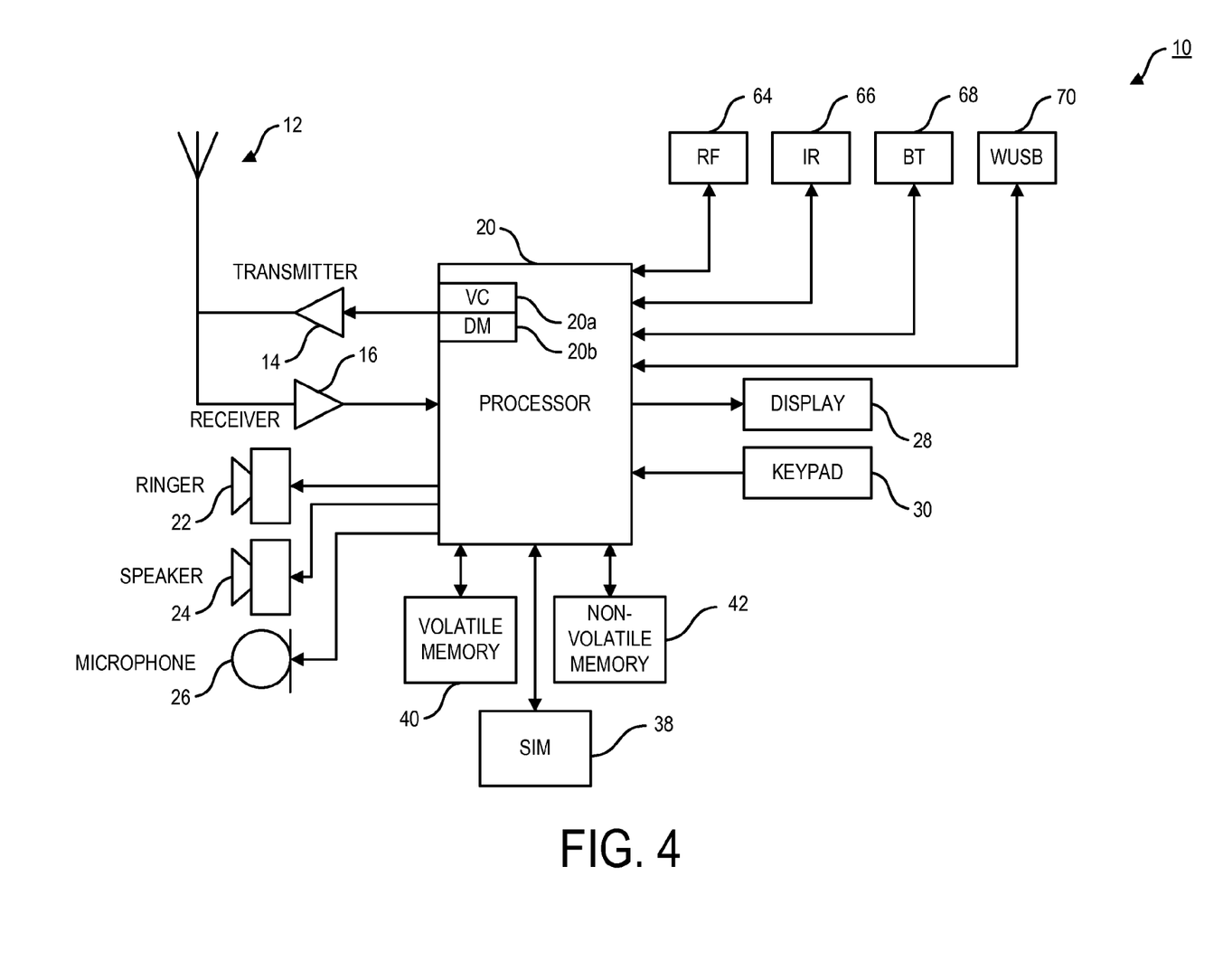
FIG. 4 depicts an example of an apparatus, in accordance with some example embodiments.

FIG. 4 illustrates a block diagram of an apparatus 10, in accordance with some example embodiments. The apparatus 10 (or portions thereof) may be configured to provide a radio, such as user equipment 199 and/or a base station 110 and/or 120. The apparatus may be implemented as any device including a wireless device, a smart phone, a cell phone, a machine type communication device, a wireless sensor, a radio relay, an access point, and/or any other radio including a processor and memory based device.

In some example embodiments, apparatus 10 may be configured to support dual connectivity including carrier aggregation.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to a user equipment and/or a base station. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment and/or a base station (see, for example, process 300).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is enabling charging for dual connectivity based on secondary evolved Node B base station information.

In some example embodiments, the dual connectivity may be in accordance with 3GPP TS 36.300 V13.2.0 (2015-12), Technical Specification: 3rd Generation Partnership Project; Technical Specification Group Radio Access Network;

Evolved Universal Terrestrial Radio Access (E-UTRA) and Evolved Universal Terrestrial Radio Access Network (E-UTRAN); Overall description; Stage 2, (Release 13) as well other revisions to this standard as well as other standards. However, the dual connectivity may be in accordance with other standards as well. Moreover, the dual connectivity may include additional connectivity, so it may include connectivity more than two (for example, a single MeNB and a plurality of SeNBs).

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions.

Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

The invention claimed is:

1. A method comprising:
   marking, by a first base station serving a user equipment, at least one packet to comprise a first indication indicating that the at least one packet was received directly at the first base station serving the user equipment;
   marking, by the first base station, at least one other packet to comprise a second indication to indicate that the at least one other packet was received via a second base station also serving the user equipment;
   receiving, at the first base station, a first downlink packet comprising a first downlink packet indication marked by a gateway node to indicate that at least the first downlink packet should be transmitted directly to the user equipment;
   receiving, at the first base station, a second downlink packet comprising a second downlink packet indication marked by the gateway node to indicate that at least the second downlink packet should be forwarded to the second base station for transmission to the user equipment; and
   reporting, by the first base station and to a network node, a deviation from a resource allocation and at least one of the first indication or the second indication.

2. The method of claim 1, wherein the first downlink packet indication comprises a cell identifier associated with the first base station and/or a base station identifier identifying the first base station, and wherein the second downlink packet indication comprises another cell identifier associated with the second base station and/or another base station identifier identifying the second base station.

3. The method of claim 2, further comprising:
   sending, by the first base station and based on the first downlink packet indication, the first downlink packet to the user equipment by transmitting the packet directly to the user equipment; and
   sending, by the first base station and based on the second downlink packet indication, the second downlink packet to the user equipment by forwarding the second downlink packet to the second base station.

4. The method of claim 1, further comprising:
   reporting, by the first base station, to the network node a resource allocation at the first base station and the second base station.

5. The method of claim 1, wherein the deviation comprises at least one downlink data packet being delivered to the user equipment via a base station that is different to what is marked in the at least one downlink data packet.

6. The method of claim 1, wherein the first indication, the second indication, and the deviation enable the network node to determine charging for the at least one packet, the at least one other packet, the first downlink packet, and/or the second downlink packet.

7. The method of claim 1, further comprising:
   marking, by the first base station, one or more uplink packets to comprise a third indication to indicate that the second base station is no longer serving the user equipment.

8. An apparatus, comprising:
   at least one processor; and
   at least one memory including computer program code, the at least one memory and the computer program code configured to, with the at least one processor, cause the apparatus to:

mark, by the apparatus serving a user equipment, at least one packet to comprise a first indication indicating that the at least one packet was received directly at the apparatus serving the user equipment;

mark, by the apparatus, at least one other packet to comprise a second indication to indicate that the at least one other packet was received via a second base station also serving the user equipment;

receive, by the apparatus, a first downlink packet comprising a first downlink packet indication marked by a gateway node to indicate that at least the first downlink packet should be transmitted directly to the user equipment;

receive, by the first apparatus, a second downlink packet comprising a second downlink packet indication marked by the gateway node to indicate that at least the second downlink packet should be forwarded to the second base station for transmission to the user equipment; and reporting, by the apparatus and to a network node, a deviation from a resource allocation and at least one of the first indication or the second indication.

9. The apparatus of claim 8, wherein the apparatus comprises a first base station.

10. The apparatus of claim 8, wherein the first indication and the second indication enable the network node to determine charging for the at least one packet, the at least one other packet, the first downlink packet, and/or the second downlink packet.

11. The apparatus of claim 8, wherein the first downlink packet indication comprises a cell identifier associated with the first base station and/or a base station identifier identifying the first base station, and wherein the second downlink packet indication comprises another cell identifier associated with the second base station and/or another base station identifier identifying the second base station.

12. The apparatus of claim 11, wherein the apparatus is further caused to at least send, based on the first downlink packet indication, the first downlink packet to the user equipment by transmitting the packet directly to the user equipment, and send, based on the second downlink packet indication, the second downlink packet to the user equipment by forwarding the second downlink packet to the second base station.

13. The apparatus of claim 8, wherein the apparatus is further caused to at least report to a network node a resource allocation at the apparatus and the second base station.

14. The apparatus of claim 8, wherein the deviation comprises at least one downlink data packet being delivered to the user equipment via a base station that is different to what is marked in the at least one downlink data packet.

15. The apparatus of claim 8, wherein the first indication, the second indication, and the deviation enable the network node to determine charging for the at least one packet, the at least one other packet, the first downlink packet, and/or the second downlink packet.

* * * * *